United States Patent
Suzuki

(10) Patent No.: US 6,520,853 B2
(45) Date of Patent: Feb. 18, 2003

(54) GAME SYSTEM

(75) Inventor: Makoto Suzuki, Shizuoka-ken (JP)

(73) Assignee: Jatco TransTechnology Ltd., Shizuoka-ken (JP)

(*) Notice: Subject to any disclaimer, the term of this patent is extended or adjusted under 35 U.S.C. 154(b) by 0 days.

(21) Appl. No.: 09/901,677

(22) Filed: Jul. 11, 2001

(65) Prior Publication Data

US 2002/0006818 A1 Jan. 17, 2002

(30) Foreign Application Priority Data

Jul. 11, 2000 (JP) ........................................ 2000-210381

(51) Int. Cl.$^7$ ................................................ A63F 13/00
(52) U.S. Cl. ............................... 463/7; 463/39; 463/49; 700/91
(58) Field of Search ................................ 463/7, 39, 49; 700/91

(56) References Cited

U.S. PATENT DOCUMENTS

| | | | | | |
|---|---|---|---|---|---|
| 5,305,201 A | * | 4/1994 | Matthews | .................... | 364/410 |
| 5,382,958 A | * | 1/1995 | FitzGerald | .................. | 342/386 |
| 5,513,854 A | * | 5/1996 | Daver | ........................ | 273/454 |
| 5,690,491 A | * | 11/1997 | FitzGerald et al. | ............ | 434/16 |
| 5,942,969 A | * | 8/1999 | Wicks | .................... | 340/286.02 |
| 6,111,541 A | * | 8/2000 | Karmel | .................. | 342/357.13 |
| 6,254,394 B1 | * | 7/2001 | Draper et al. | ................. | 434/11 |
| 6,287,200 B1 | * | 9/2001 | Sharma | ........................ | 463/40 |
| 6,320,495 B1 | * | 11/2001 | Sporgis | ....................... | 340/323 |
| 6,456,232 B1 | * | 9/2002 | Milnes et al. | ................ | 342/107 |
| 6,456,938 B1 | * | 9/2002 | Barnard | ....................... | 701/213 |

FOREIGN PATENT DOCUMENTS

| | | |
|---|---|---|
| JP | 600143800 | 7/1985 |
| JP | 630310212 | 12/1988 |
| JP | 060126019 | 5/1994 |
| JP | 010048360 | 2/1998 |

OTHER PUBLICATIONS

Search Report under Section 17 dated Dec. 18, 2001.

* cited by examiner

Primary Examiner—Henry C. Yuen
Assistant Examiner—Frederick Nicolas
(74) Attorney, Agent, or Firm—Blank Rome Comisky & McCauley, LLP

(57) ABSTRACT

Disclosed herein is a game system having a detection unit for detecting a position of a spot moved from a start spot, a measurement unit for measuring time, and a decision unit for deciding whether or not spots measured by the detection unit have enclosed an area within a set time measured from the start spot by the measurement unit. The game system further has a computation unit for computing a size of a distance between the measured spots, or a size of the area enclosed with the measured spots, when the decision unit decides that there has been enclosure. The victory or defeat of a game player is determined by the size of the length or the size of the area, computed by the computation unit.

7 Claims, 13 Drawing Sheets

50

GAME SYSTEM

BACKGROUND OF THE INVENTION

1. Field of the Invention

The present invention relates to a game system, and more particularly to a novel game system which is a sort of position occupying game like a game of "go" but differs essentially from an indoor game like "go" in that the body of a player is moved, and which further differs from a scramble type position occupying game such as a soccer game and a rugby game, in that players all move in all directions within an extensive game area.

2. Description of the Related Art

Play (including games) for children has an important part in learning rules and manners necessary for life in society, and in addition, play requiring functional movement of the body is considered useful in that reflexes, muscular strength, and sustaining power are developed. However, the main current of play has recently been shifted to indoor games like television games. Particularly, there is fear for sound upbringing of young people.

Directing attention to outdoor play requiring functional movement of the body in view of such a social background, most play falls under the category of a sport. Of people having a tendency to stay indoors, young people watch sports, but it is regrettable that they do not positively take part in sports. The first reason is that every possible sport requires troublesome, tedious practice to one degree or another. The second reason is that many of the lovers of television games have had a mental habit of entering into a virtual world on the screen. Unless a motion-type game having excitement of a virtual world without requiring practice is developed, achievement of social needs for upbringing of young people through outdoor sports will be fairly difficult.

As described above, the conventional game systems represented by television games have the disadvantage that they are unsuitable for the relation with people and the growth and health promotion of the body, because they are exclusively employed indoors.

SUMMARY OF THE INVENTION

The present invention has been made in view of the circumstances mentioned above. Accordingly, it is the primary object of the present invention to provide a novel game system which is capable of having excitement of a virtual world without requiring practice, also causing a player to move in all directions within an extensive game area in cooperation with other players, and making a contribution to the relation with people and the growth and health promotion of the body.

To achieve this end, there is provided a game system comprising: detection means for detecting a position of a spot moved from a start spot; measurement means for measuring time; decision means for deciding whether or not spots measured by the detection means have enclosed an area within a set time measured from the start spot by the measurement means; and computation means for computing a size of a distance between the measured spots, or a size of the area enclosed with the measured spots, when the decision means decides that there has been enclosure; wherein victory or defeat of a game player is determined by the size of the length or the size of the area, computed by the computation means.

In the game system of the present invention, the decision means may decide that there has been enclosure, when the last spot of the measured spots is within a set distance from the start spot. In addition, the set distance in the decision means may be varied with the lapse of time measured by the measurement means. Furthermore, the set time that is measured with the measurement means can be set so that it varies with every start.

According to the present invention, a game requiring movement of a player can be performed by utilizing GPS satellites. That is, a player sets an arbitrary spot within an extensive game area in cooperation with the other players of the self-team and moves within the game area. Furthermore, the progress of the game is made in a virtual game area. This can interest people being accustomed to indoor games such as television games, particularly young people. And young people are urged to join the game. Therefore, the game system of the present invention is capable of contributing to the relation with people and the growth and health promotion of the body.

BRIEF DESCRIPTION OF THE DRAWINGS

The present invention will be described in further detail with reference to the accompanying drawings wherein.

DESCRIPTION OF THE PREFERRED EMBODIMENTS

A preferred embodiment of a game system suitable for a "position occupying game" will hereinafter be described in detail with reference to the drawings.

I. Outline of the Game

In the game system of the preferred embodiment, at least two camps (also called teams) play a position occupying game. The progress of the game is all made electronically by both a "referee machine," and a "parent machine" distributed to each team. Players send necessary information to the referee machine or parent machine by manipulating an electronic device called a "flag machine," and also act according to a command given by the referee machine or parent machine and pursuant to rules. That is, a game area virtually made in the interiors of the referee machine and the parent machine (hereinafter referred to as a virtual game area) is replaced with a game area having actuality (hereinafter referred to as an actual game area), and the position occupying game is enjoyed.

In the game system of the preferred embodiment, the game participants are divided into at least two groups, excluding a referee part. In the preferred embodiment, one group is called an A-team and another group is called a B-team. The referee part acquires information necessary for the game progress from the parent machines of both teams, while grasping the war situations of both teams, using the aforementioned referee machine. The referee part also selects necessary information and sends it to the parent machines of both teams. The position of the referee part is suitably selected within the radio communication range between itself and the parent machines of both teams. On the other hand, members of each team are players who actually move, excluding at least a person who manipulates the parent machine. Each player with a flag machine and a portable radio machine moves in all directions through the extensive, actual game area spreading between the bases of both teams, and acquires a region within the actual game area pursuant to predetermined rules. A team that first meets the decision condition described later within a predetermined time wins the game.

II. Electronic Equipment for Players

Figure 1:
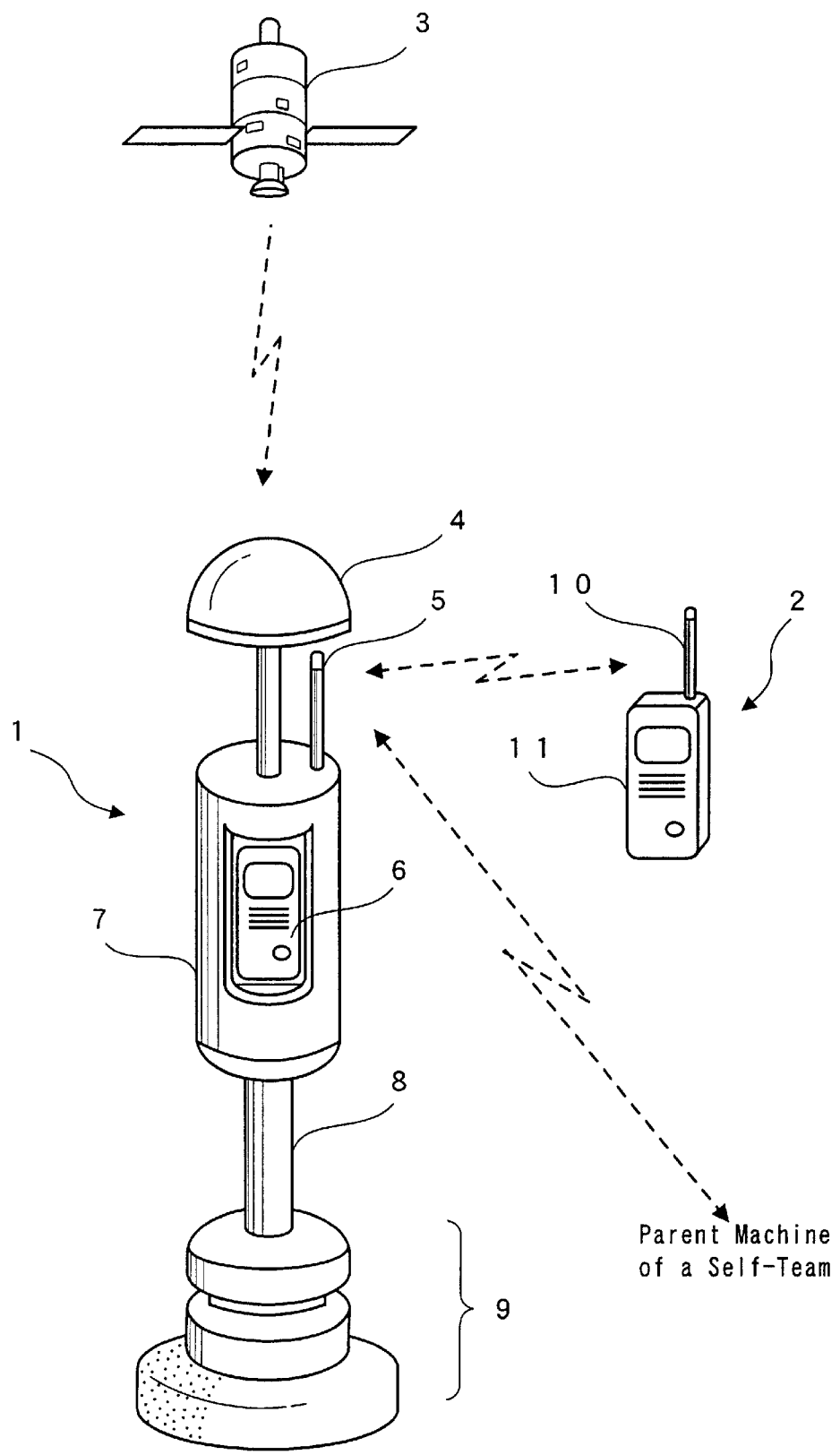
FIG. 1 is a perspective view showing a game system constructed according to an embodiment of the present invention.

In FIG. 1, reference numeral 1 denotes a flag machine and reference numeral 2 denotes a portable radio machine. The flag machine 1 is equipped with a global positioning system (GPS) antenna 4 for receiving a radio wave from a GPS satellite 3; a transmitting-receiving antenna 5 for receiving a radio wave from a portable radio machine 2 of a self-team (hereinafter referred to as a self-radio machine) or a parent machine (not shown) of the self-team (hereinafter referred to as a self-parent machine), and transmitting a radio wave to the self-radio-machine 2 or the self-parent machine; a main body portion 7 incorporating an electric unit 6 which has a GPS position measuring function and a data transmitting-receiving function; and a proximal portion 9 for supporting the main body portion 7 through a stay 8. The portable radio machine 2 is equipped with an antenna 10 for receiving a command, relayed through the electronic unit 6 of the flag machine 1, and transmitted from the self-parent machine (e.g., a voice synthesis command, or a voice command from the operator of the self-parent machine), and for transmitting a response. The portable radio machine 2 is also equipped with an electronic circuit section 11 having a loudspeaker function and a response function (a voice response or a switch operation response) for the aforementioned command.

The flag machine 1 is used for inputting information on an arbitrary spot in the actual game area (latitude-longitude information) to the virtual game area. That is, if the flag machine 1 being operated is placed on the ground, a switch (not shown) in the proximal portion 9 is switched on by the dead weight of the flag machine 1. In response to this, the coordinate information at the spot (measured by the use of a radio wave from the GPS satellite 3) is transmitted from the antenna 5 to the self-parent machine. The coordinate information is further transmitted from the self-parent machine to the referee machine. The switch in the proximal portion 9, the GPS antenna 4, and the electronic unit 6 constitute position detection means.

The actual game area, incidentally, includes not only flat ground but a large number of obstacle zones such as sharp slopes (a cliff, etc.), damp ground, ponds, rivers, etc. It is desirable that the flag machine 1 be constructed so that even in such obstacle zones, it can perform the measurement of spot information and the transmission of information without difficulty. The stay 8, for example, can be constructed to be freely flexible so that the directivity of the GPS antenna 4 or transmitting-receiving antenna 5 is obtained even at a sharp slop. It is also desirable that the flag machine 1 float on water. Furthermore, it is desirable in consideration of water depression or use in rainy weather that it prevent an entrance of water.

The role of the portable radio machine 2, as described above, amplifies a command (voice) given by the self-parent machine and sends out the response to the self-parent machine. However, it is also possible to allot this role to the flag machine 1. That is, the electronic unit 6 of the flag machine 1 may have both the function of amplifying a command (voice) sent from the self-parent machine and the function of sending back the response to the self-parent machine. If done in this manner, the portable radio machine 2 can be eliminated. In the case of employing the portable radio machine 2, it is preferable that the communication distance between the flag machine 1 and the portable radio machine 2 be as short as possible (about 20 to 30 m). This prevents an unjustifiable act, which disturbs the progress of a game, such as far movement of a player with the portable radio machine 2 from the flag machine 1 to scout an enemy team.

Figure 2:
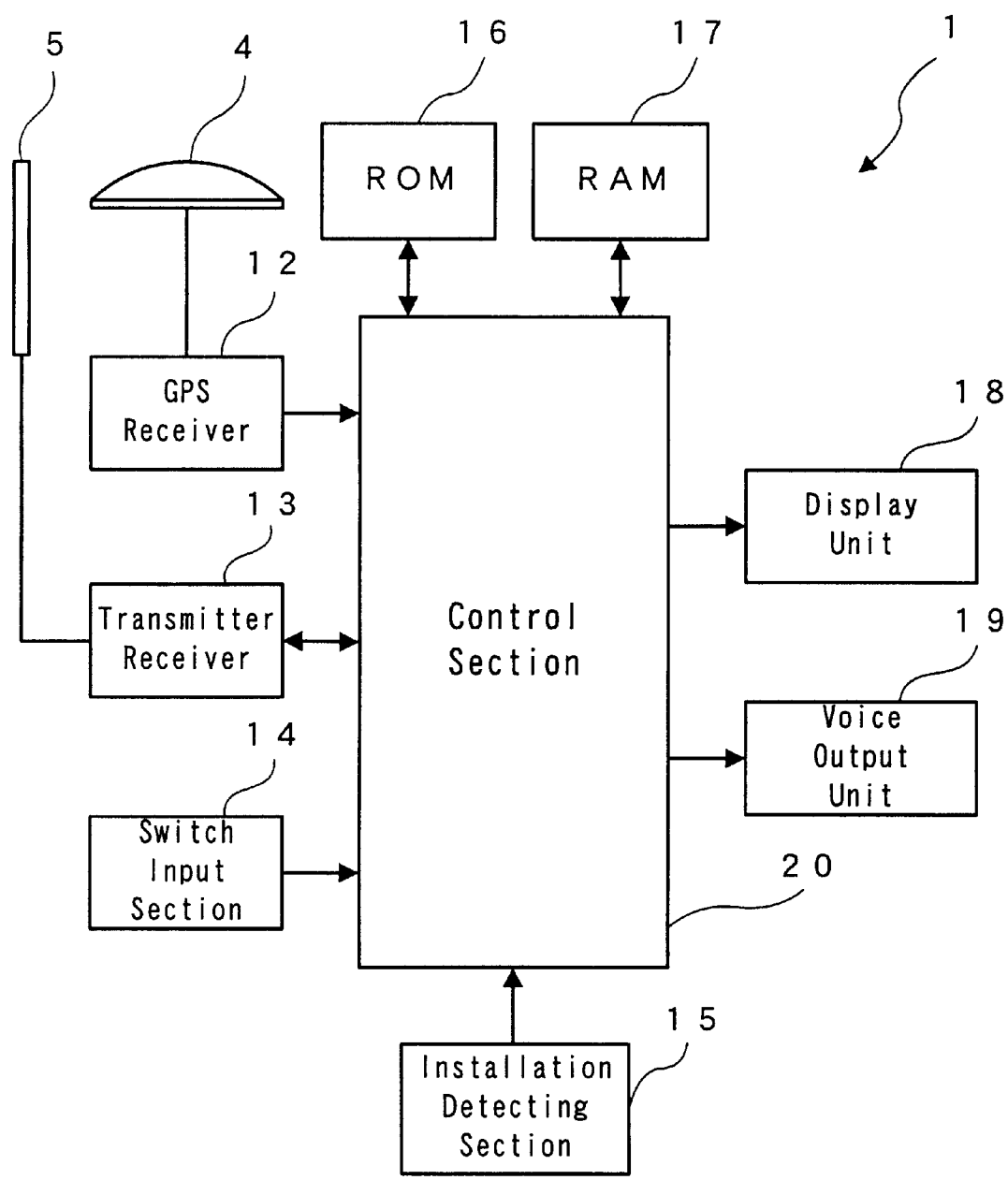
FIG. 2 is a block diagram showing the flag machine of FIG. 1.

FIG. 2 shows the construction of the flag machine 1. The flag machine 1, in addition to having the GPS antenna 4 and the transmitting-receiving antenna 5, is further equipped with a GPS receiver 12, a transmitter-receiver 13, a switch input section 14, an installation detecting section 15, a read-only memory (ROM) 16, a random access memory (RAM) 17, a display unit 18, a voice output unit 19, and a control section 20. Each section, excluding the GPS antenna 4, the transmitting-receiving antenna 5, and the installation detecting section 15, is mounted in the electronic unit 16 shown in FIG. 1, and the installation detecting section 15 is incorporated into the proximal portion 9 shown in FIG. 1. The essential section (particularly the GPS position-measuring section) of the flag machine 1 is replaceable with a commercially-available car navigation unit. The section, including the control section 20, the ROM 16, the RAM 17, the display unit 18, and the voice output unit 19, is also replaceable with a computer applied product such as a game machine, a personal computer, etc. Furthermore, the installation detecting section 15 is not limited to a type detecting a spot when installed on the ground. For example, the installation detecting section 15 may be of a push button type where a spot is detected and marked if a player pushes the button.

The GPS antenna 4 is, for example, a mirostrip patch antenna, employing a Teflon board, which has semispherical directivity, for receiving a right-handed polarized wave signal of about 1.5 MHz which is sent from the GPS satellite 3. The GPS receiver 12 receives and demodulates position-measuring radio waves sent from a plurality of GPS satellites, through the GPS antenna 4, and also calculates the current position information of the flag machine 1 (e.g., latitude-longitude information), based on the demodulated signal. Furthermore, the GPS receiver 12 outputs the calculated current position information to the control section 20. The GPS is a position measuring system utilizing artificial satellites, and receives radio waves from three or more satellites of a total of 24 satellites disposed four by four in six earth-circling orbits, also calculates the distance between the receiving spot and each satellite from the arrival time, and measures the position of the receiving spot (in the case of 3 satellites, a two-dimensional position, latitude and longitude).

The transmitting-receiving antenna 5 is used for receiving information transmitted from the self-radio machine or self-parent machine, and transmitting information to the self-radio machine or self-parent machine. The transmitting-receiving antenna 5 employs, for example, a non-directional antenna. The transmitter-receiver 13 demodulates the information from the self-parent machine, received through the transmitting-receiving antenna 5, and outputs information for game progress to the control section 20. In addition, the transmitter-receiver 13 modulates information (particularly the positional information of the flag machine 1) which is sent from the control section 20 to the self-parent machine, also transmits the modulated information through the transmitting-receiving antenna 5, and relays information between the self-parent machine and the self-radio machine.

The control section 20 is constructed, for example, of a microcomputer that is operated by manipulating the switch input section 14. This microcomputer controls the general operation of the flag machine 1 by loading the program stored in the ROM 16 into the RAM 17 and executing the program. The microcomputer also receives the positional information from the GPS receiver 20, responds to the switching action of the installation detecting section 15 that is made on when the flag machine 15 is placed on the ground, and realizes a positional-information notification function of sending out the positional information at that time to the self-parent machine. Note that these functions may be performed in a hardware manner.

The display unit 18 is used to monitor the operation of the flag machine 1 or display the current position. The voice output unit 19 is used to amplify and output a command sent from the self-parent machine. The self-radio machine also has the function of amplifying and outputting a command sent from the self-parent machine. Therefore, if the flag machine 1 communicates with the self-parent machine by use of this self-radio machine, the voice output unit 19 of the flag machine 1 can be eliminated.

III. Referee Machine and Parent Machine

Figure 3:
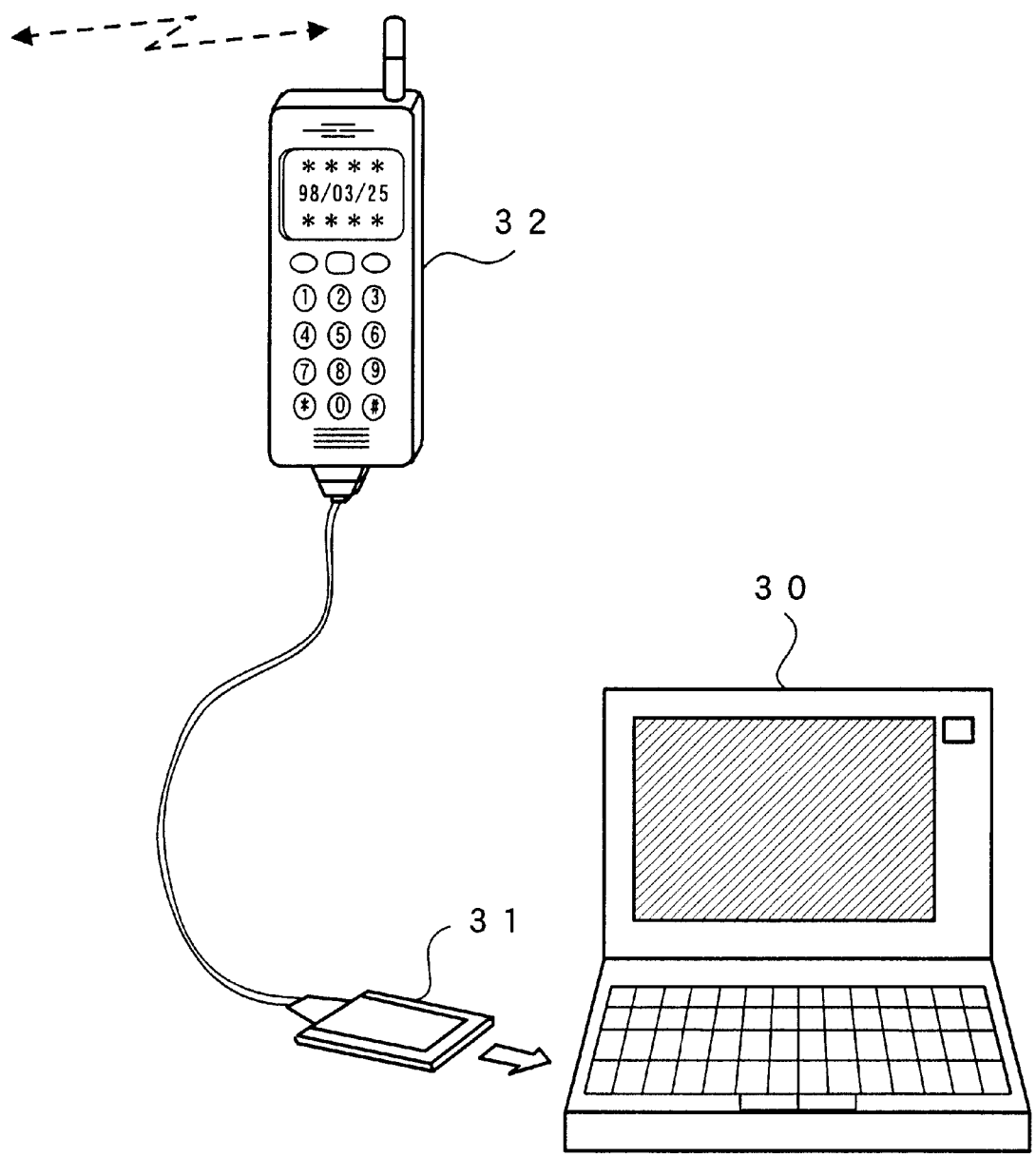
FIG. 3 is a perspective view showing a referee machine or parent machine.

As previously described, a single referee machine is employed and a single parent machine is employed in each team. That is, the game requires a single referee machine and two parent machines. The referee machine and the parent machine, as shown in FIG. 3, can be constructed with a general-purpose personal computer 30, a communication modem 31, and a radio communication unit 32 with a data transfer function (which is not limited to the portable telephone shown in the figure). The referee machine and the parent machine are the same in appearance. They are differentiated from each other by programs that are executed. That is, if a program for the referee machine is executed, the personal computer 30 is used as the referee machine. If a program for the parent machine is executed, the personal computer 30 is used as the parent machine. An allowable enclosure time can be set to the referee machine. The referee machine has measurement means for measuring time from start of the flag machine, and decision means for deciding whether or not the flag machine has succeeded in enclosing an area within the aforementioned set time. The referee machine further has enclosure-result computation means for computing an enclosed area, or a moving measured-value converted distance for the flag machine, when the enclosure is successful.

IV. Function Common to the Referee Machine and the Parent Machine

The referee machine and the parent machine, in addition to having the functions that the personal computer 30 has (e.g., a display function, a file managing function, a data input-output function, a printing function, etc.), further have a function of recognizing the communication modem 31.

V. Functions Peculiar to the Referee Machine

The referee machine, in addition to having all the functions necessary for game progress, that is, a function of identifying the parent machine or flag machine, a function of receiving information transmitted from the parent machine (and also receiving information transmitted from the flag machine through the parent machine), and a function of selecting necessary information and transferring the information to the parent machine, further has a variety of functions for generation of the virtual game area, game mediation, decision of victory or defeat, management of a game time, evaluation of game results, etc. Particularly, the function of deciding victory or defeat is indispensable to this referee machine.

In the referee machine, victory or defeat is decided based on the following conditions. Initially, the referee machine sequentially acquires spot coordinate information on each player of each team from the parent machine of each team. This spot coordinate information for the A-team, for example, indicates the installation place of the flag machine, carried by the players of the A-team, and placed on an arbitrary spot. The spot coordination information is specified by utilizing radio waves sent from GPS satellites. The referee machine computes a triangular figure from a plurality of continuous spot coordinates acquired within a predetermined time by the A-team. For instance, a triangular figure is computed from three continuous spot coordinates acquired by the A-team immediately after start of the game. In the case where a triangular figure has been computed, another triangular figure is computed from three spot coordinates that include the last vertex of the first triangular figure. And the areas of the triangular figures are compared between teams. A team with a larger area wins the game. For example, assuming "a" represents the total area of the triangular figure in the A-team and that "b" represents the total area of the triangular figure in the A-team, the A-team wins the game when a>b.

Note that in the case where the area of a triangular figure is not within a criterion, the triangular figure can be invalidated. In this case, if the team is caused to return to the first vertex of the triangular figure, it is desirable because the complexity of the game increases.

In addition, the total of the three sides of the triangular figure may be employed instead of the area of the triangular figure. That is, the totals of the three sides of triangular figures are compared between teams. The team whose total of the three sides of a triangular figure is greater wins the game. As with the aforementioned case, in the case where the total of the three sides of a triangular figure is not within a criterion, the triangular figure can be invalidated. The team can be instructed to return to the first vertex of the triangular figure.

VI. Functions Peculiar to the Parent Machine

The parent machine has only the functions, necessary for the action of the self-team, among the functions necessary for game progress. In other words, the parent machine has only the function of completely grasping the movement of the self-team and the function of grasping part of the movement of the opponent team, among the functions that the referee machine has. Since the parent machine can grasp only part of the movement of the opponent team, the operator of the parent machine needs to predict the strategy and intention of the opponent team from a small amount of information to control the movement of the players of the self-team. A difference in skill occurs between the operators of the parent machines and increases the excitement of the game.

VII. Construction of the Referee Machine and Parent Machine

Figure 4:
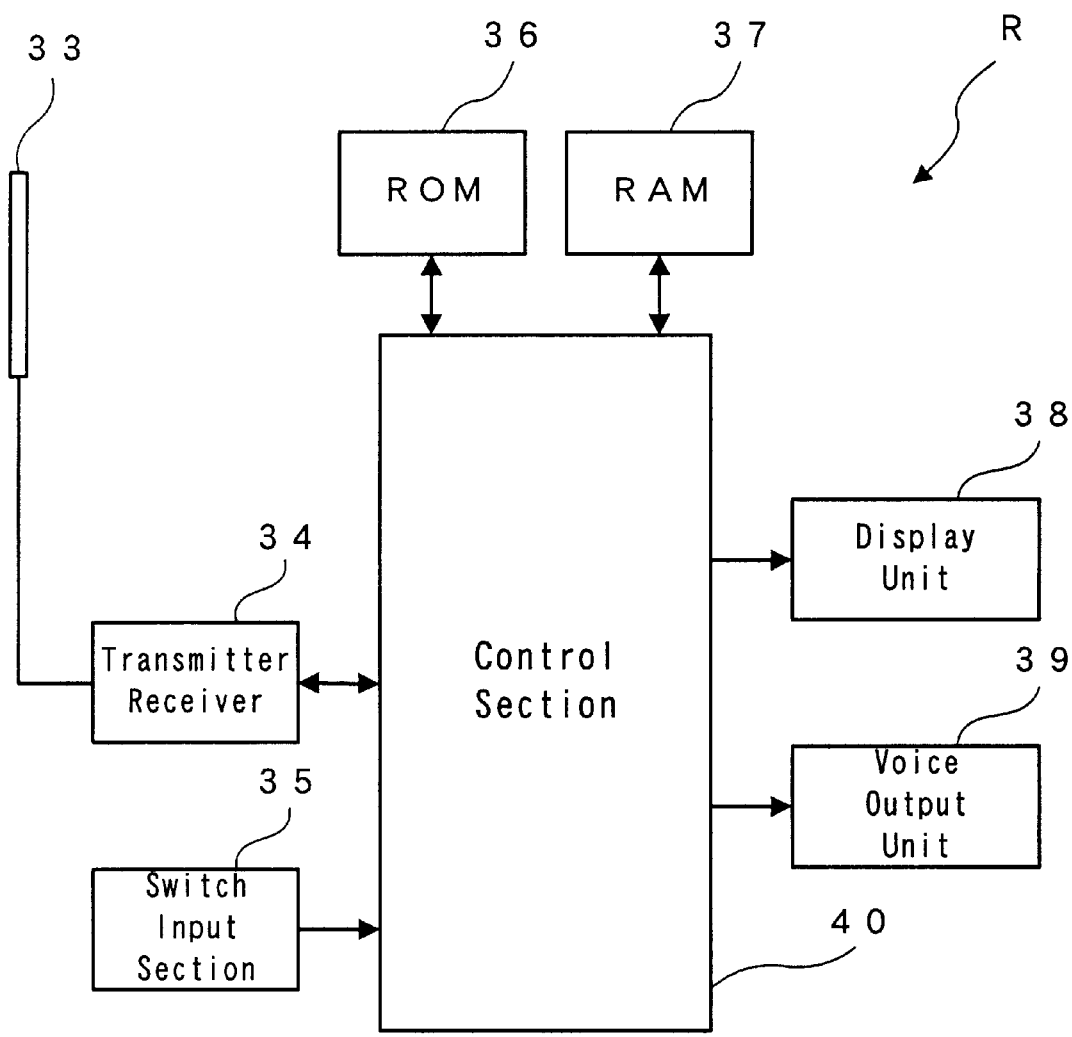
FIG. 4 is a block diagram of the referee machine or parent machine shown in FIG. 3.

FIG. 4 shows a block diagram of the referee machine or parent machine (hereinafter represented with the referee machine). In the figure, the referee machine R is equipped with a transmitting-receiving antenna 33, a transmitter-receiver 34, a switch input section 35, a ROM 36, a RAM 37, a display unit 38, a voice output unit 39, and a control section 40. If it is constructed as shown in FIG. 3, the referee machine R is further equipped with a hard disk, a CD-ROM drive, a PC card slot, etc. The referee machine R functions as the referee machine or the parent machine by executing a referee-machine program or a parent-machine program, installed in the hard disk. Note that the transmitting-receiving antenna 33 and transmitter-receiver 34 in FIG. 4 correspond to the communication modem 31 and portable radio communication unit 32 of FIG. 3. The switch input section 35 in FIG. 4 corresponds to the input devices (keyboard, mouse, pointing device, etc.,) of the personal computer 30 of FIG. 3.

The control section 40 realizes the functions required of the referee machine or parent machine by executing the referee-machine program or parent-machine program. However, there is a great difference in information transmission between the referee machine and the parent machine. That is, the referee machine can transmit and receive information between itself and all the parent machines, while the parent machine can transmit and receive information only between itself and the referee machine. The management of such information transmission can be realized if a sender-identifying code is contained in information so that the parent machine can receive only the information sent from the referee machine. Furthermore, the information that is transmitted from the referee machine to the parent machine is limited to information necessary for the team to which that parent machine belongs. In the case where information for the opponent team is transmitted in error, the progress of the game is disturbed. The management of receivers to which information is transmitted can also be realized by containing a destination-identifying code into information.

VIII. Example of an Actual Game Area or Virtual Game Area

Figure 5:
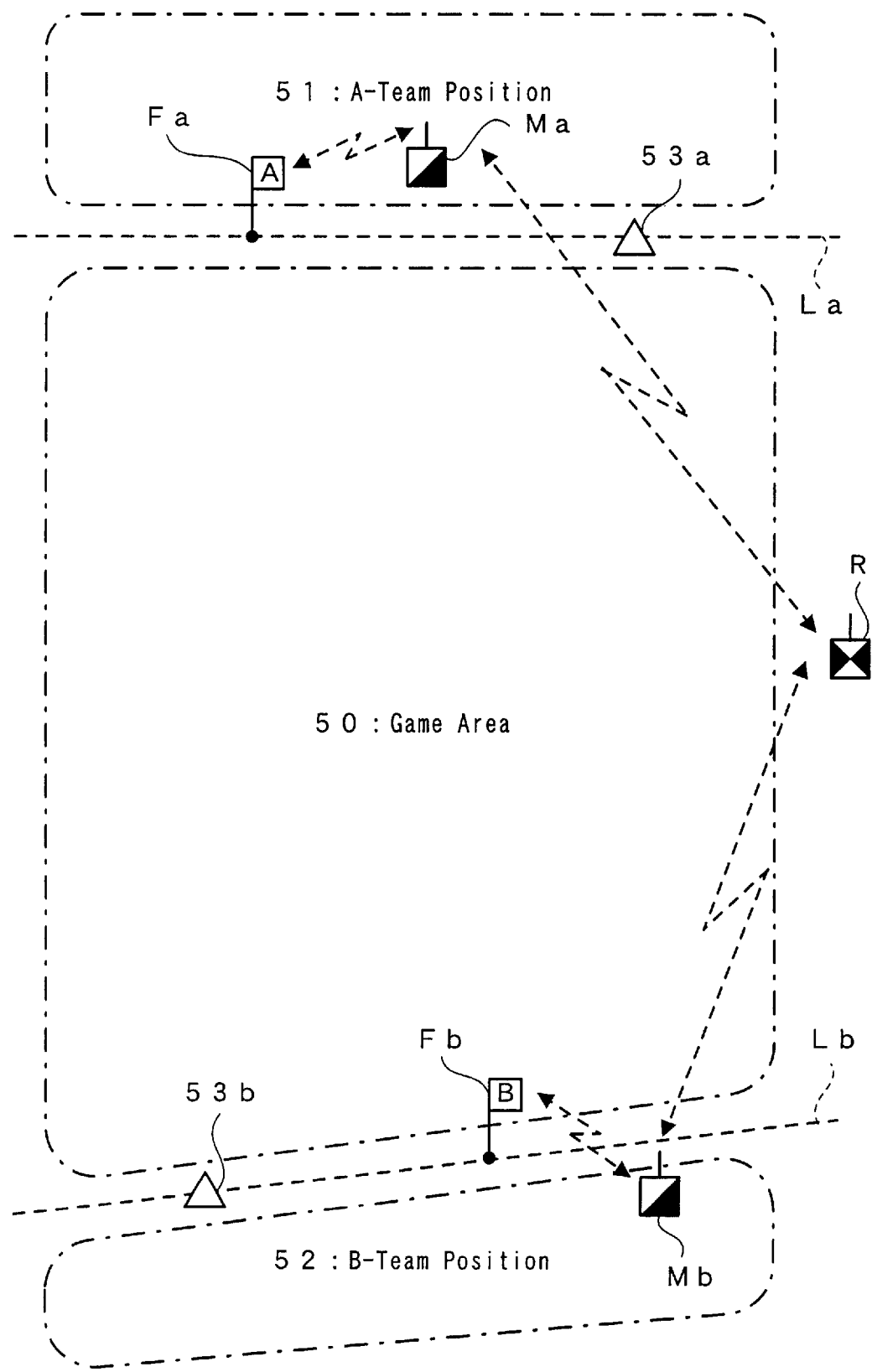
FIG. 5 is a diagram showing a game area.

FIG. 5 illustrates an example of an actual game area or virtual game area. In the figure, a position 51 for the A-team line (hereinafter referred to as an A-team position) and a position 52 for the B-team (hereinafter referred to as a B-team position) are disposed to face each other across a game area 50. The referee machine R is disposed in a proper place between the A-team position 51 and the B-team position 52. The parent machine $M_a$ for the A-team is disposed in a proper place within the A-team position 51. Similarly, the parent machine $M_b$ for the B-team is disposed in a proper place within the B-team position 52. Furthermore, the flag machine $F_a$ for the A-team is disposed near the parent machine $M_a$, and the flag machine $F_b$ for the B-team is disposed near the parent machine $M_b$.

The declaration of the setting of a camp by each team is made by placing the flag machine $F_a$ or $F_b$ on a proper spot, then transmitting the coordination information on that spot to the parent machine $M_a$ or $M_b$ and the referee machine R, and setting a proper spot 53a or 53b onto an imaginary line La or Lb passing through the installation point of the flag machine $F_a$ or $F_b$. In the illustrated example, the A-team position 51 is disposed above the imaginary line $L_a$, and the B-team position 52 is disposed below the imaginary line $L_b$.

In FIG. 5, the positions of both teams ($L_a$, $L_b$), the positions of the parent machines ($M_a$, $M_b$), the positions of the flag machines ($F_a$, $F_b$), etc., are shown. However, these should be grasped only by the referee machine R. The parent machines ($M_a$, $M_b$) of both teams should grasp only minimum information necessary for game progress, that is, all information related to the self-team and the position of the opponent team. Therefore, only the positions of $M_a$, $F_a$, and $L_b$ are displayed on the screen of the parent machine $M_a$ of the A-team. Similarly, only the positions of $M_b$, $F_b$, and $L_a$ are displayed on the screen of the parent machine $M_b$ of the B-team.

The victory or defeat of the game, as described above, is decided by comparing the areas of the triangular figures (or totals of the three sides of the triangular figures) acquired by both teams, and the rule for acquiring an area is as follows:

IX. Rule for Acquiring an Area

The configuration of an area that can be acquired in one round of the game is limited to a triangle. The kind of the triangle does not matter if it has three vertexes. The flag machine is set at each vertex, and the positional coordinate information at the vertex is transmitted to the parent machine and the referee machine.

Figure 6A:
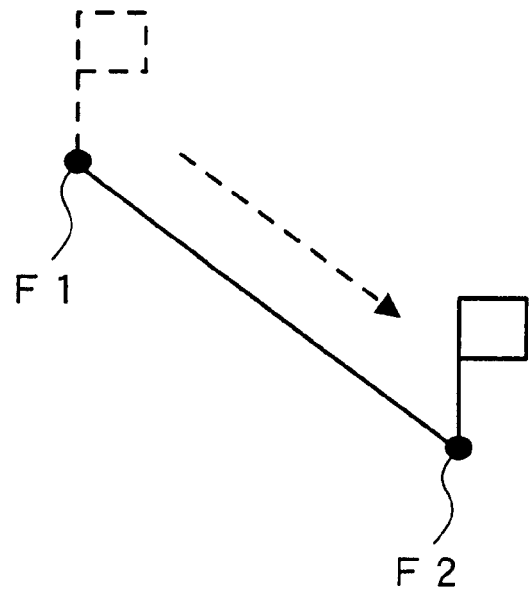
FIGS. 6A and 6B are diagrams showing how an area is acquired in the first round of a game.
Figure 6B:
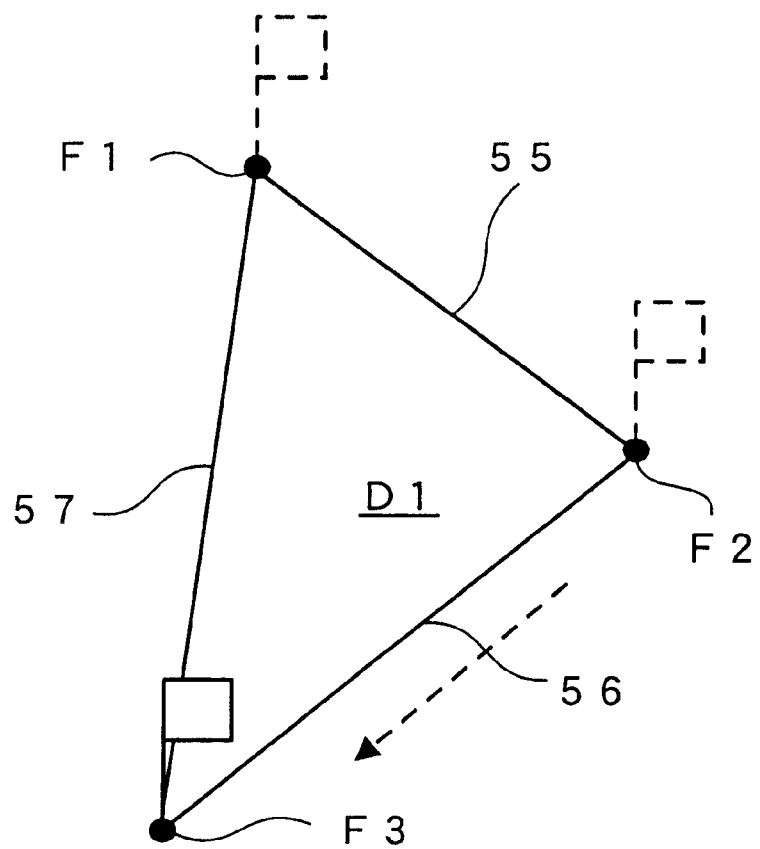

FIG. 6 shows one round of the game. The flag machine is set at the first vertex F1 which is a start spot, and the positional coordinate information is transmitted. Then, the flag machine is moved and set at a vertex F2, and the positional coordinate information is transmitted. Next, the flag machine is moved and set at a vertex F3, and the positional coordinate information is transmitted. In this manner, one round of the game ends. As shown in FIG. 6B, the area D1 enclosed by the three sides 55 to 57 between the vertexes F1 to F3 is an area acquired by the team having the flag machine. When this occurs, the measurement means of the electronic unit 6 measures the time that has elapsed from the point of time that installation of the flag machine was started. A set time allowable for each enclosing has been input to the referee machine. If the registered data for the measured spot F2, and the registered data for the measured spot F3 following F2 and F1, are not transmitted within the aforementioned set time, the enclosure decision means of the referee machine R decides that the team has failed to enclose a triangle. On the other hand, if the data for the measured spot F2 and the data for the measured spot F3 are transmitted within the set time, the enclosure decision means decides that the team has succeeded in enclosing a triangle. And the area of the triangle is computed by the enclosure-result computation means.

Figure 7A:
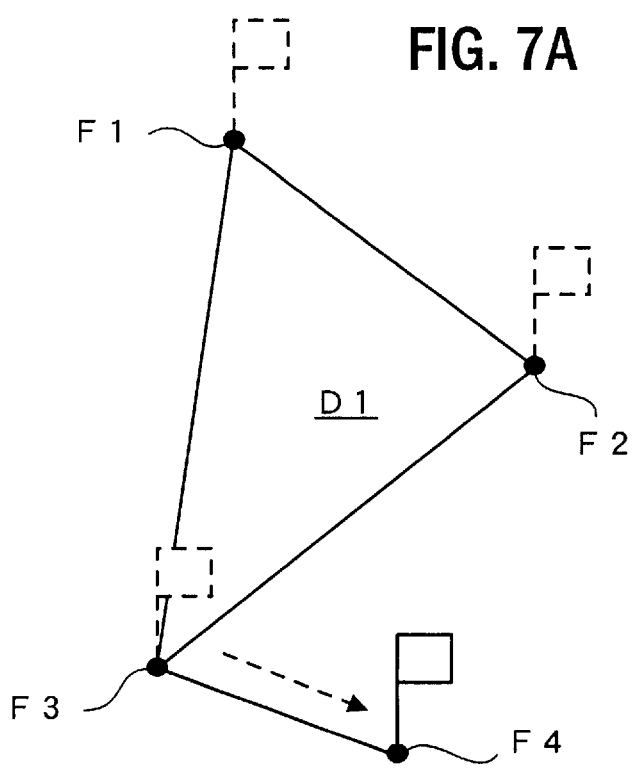
FIGS. 7A and 7B are diagrams showing how an area is acquired in the second round and the rounds thereafter.
Figure 7B:
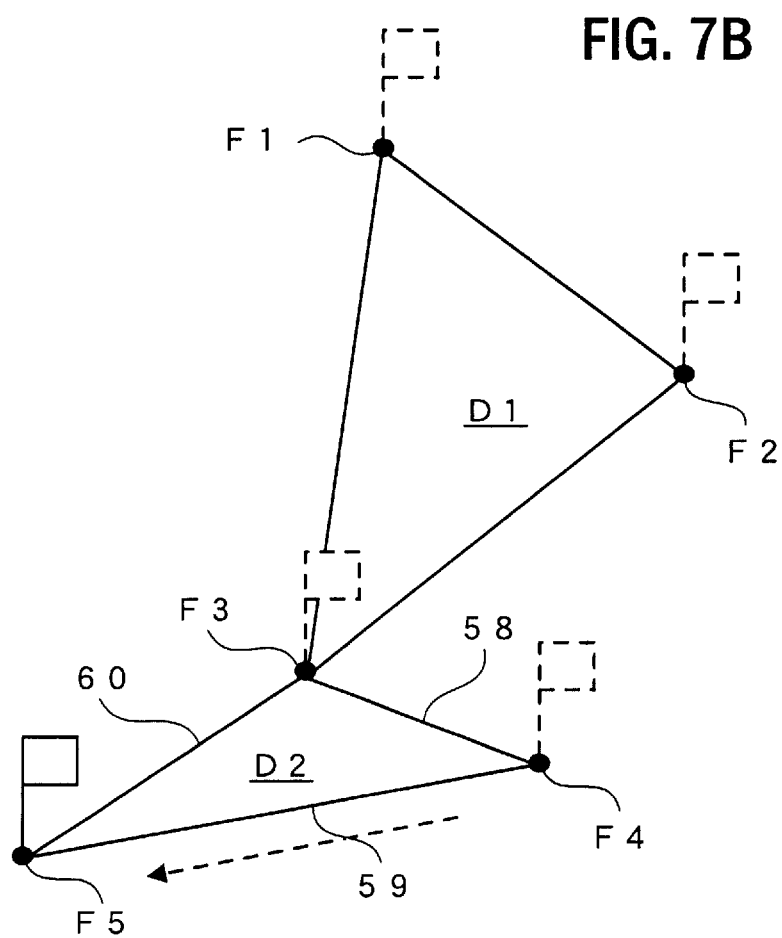

In the second round and the rounds thereafter, the operation of setting the flag machine is performed only twice, because the flag machine is moved from one of the vertexes of the triangle acquired in the previous round. That is, in FIG. 7, the vertex F3 is one of the vertexes of the triangle that has been acquired. The flag machine is moved from this vertex F3 to a vertex F4 and is set at the vertex F4. Then, the flag machine is moved to a vertex F5 and set at the vertex F5. In the illustrated example, the total of the area D1 of the previously acquired triangle and the area D2 enclosed by the sides 58 to 60 between the vertexes F3 to F5 is the total of the areas acquired by the team having the aforementioned flag machine. The total area (D1+D2) is compared with that of the opponent team to decide victory or defeat. In the case where the total of the three sides of a triangle is compared with that of the opponent team, the comparison may be made for each triangular figure.

X. Display of an Interference Area

Figure 8:
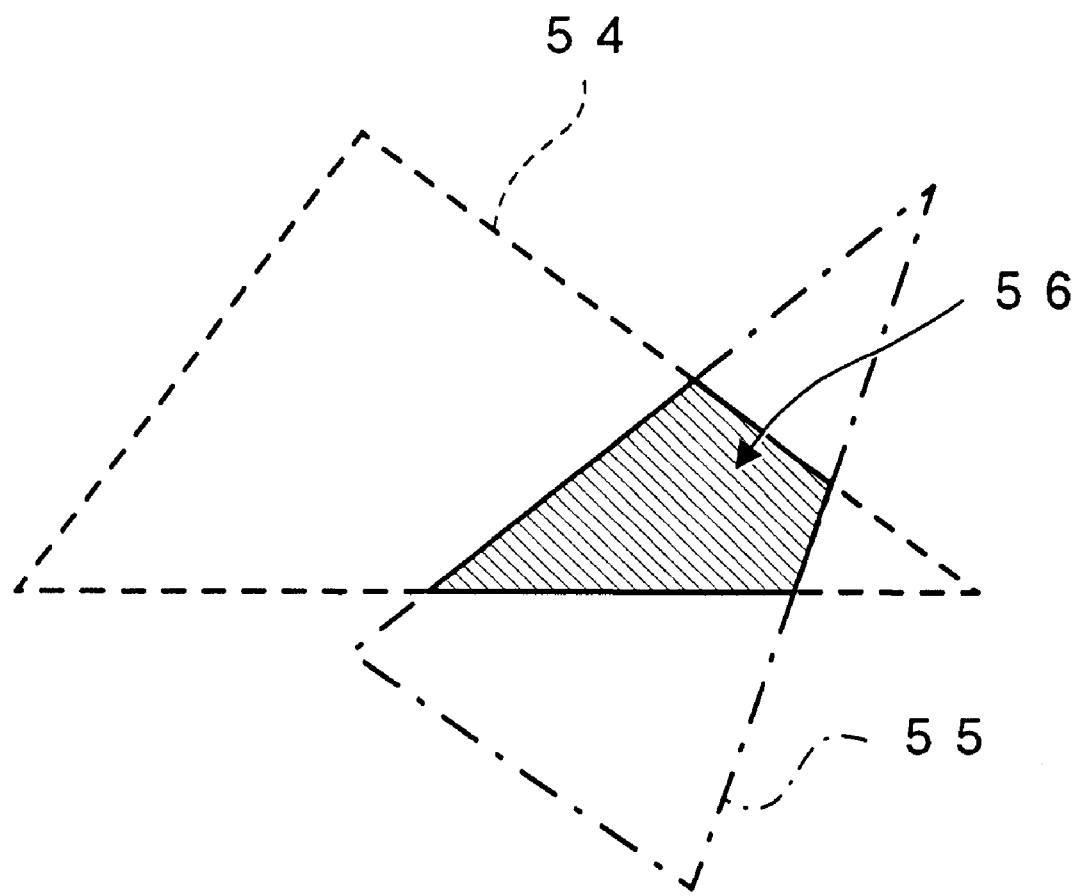
FIG. 8 is a diagram showing the state in which an area acquired by one team partially overlaps that of the other team.
Figure 9A:
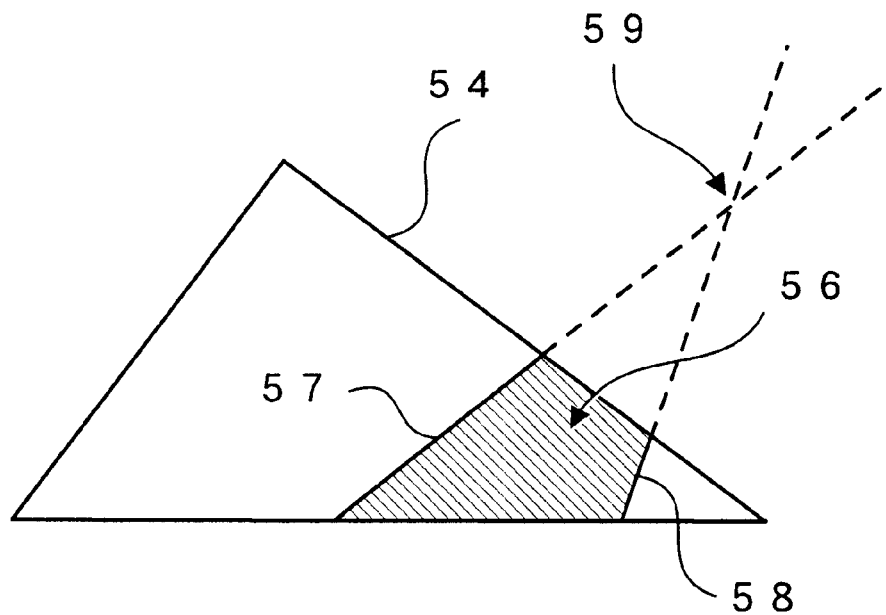
FIG. 9A is a diagram showing the display screen of one team, on which an area acquired by the one team is displayed but an area acquired by the other team is not displayed.
Figure 9B:
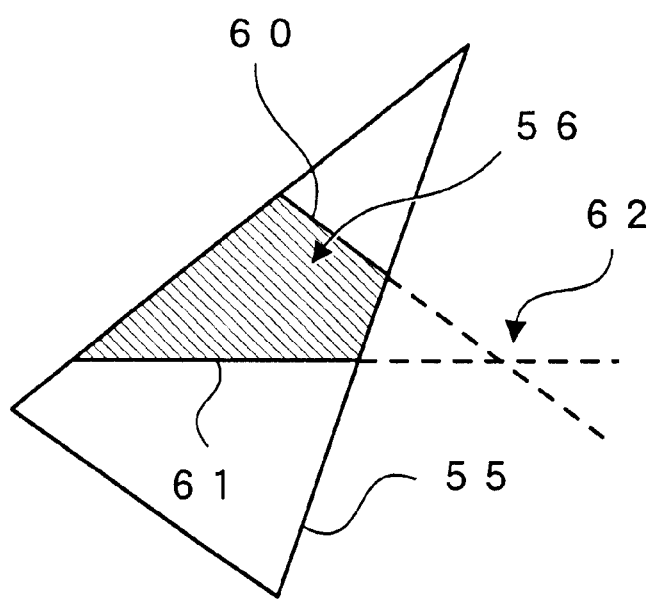
FIG. 9B is a diagram showing the display screen of the other team, only an area acquired by the other team having been displayed.

If the round of the game is repeatedly performed, there will occur cases where the acquired area of one team overlaps part of the acquired area of the other team. In such cases, the place where the flag machine of the opponent team was installed can be predicted by utilizing the aforementioned interference. As illustrated in FIG. 8, it is now assumed that the acquired area of one team partially overlaps that of the other team. A triangle 54 shown by a broken line indicates the acquired area of the A-team, while a triangle 55 shown by a broken line indicates the acquired area of the B-team. The interference area between the triangles 54 and 55 is indicated by a shaded portion 56. The display of FIG. 8 is the screen of the referee machine R. In the screens of the parent machines $M_a$, $M_b$, only the acquired area of the self-team and the interference area are displayed. The display screen of the parent machine $M_a$ in the A-team is shown in FIG. 9A, and the display screen of the parent machine $M_b$ in the B-team is shown in FIG. 9B. Thus, an area acquired by the opponent team is not displayed.

In FIG. 9A, an intersection 59 can be obtained, if two sides 57, 58, not contacting with the three sides of a triangle 54, among the four sides of an interference area 56, are extended. In FIG. 9B, an intersection 62 can likewise be obtained, if two sides 60, 61, not contacting with the three sides of a triangle 55, among the four sides of the interference area 56, are extended. The intersection 59 or 62 is one of the three vertexes of the triangle acquired by the opponent team. Therefore, with this result of prediction, the following rule (for extinguishing an area acquired by the opponent team) can be positively utilized. This is able to increase the excitement of the game.

XI. Rule for Extinguishing an Area Acquired by the Opponent Team

In the case where a vertex of a triangle acquired by an opponent team (hereinafter referred to as an inclusion vertex) is included in the interior of a triangle acquired by a self-team, the triangle of the opponent team having the inclusion vertex is invalidated and extinguished. If the middle triangle in a plurality of continuous triangles is extinguished, triangles separated from the camp of the team will occur and the supply line will bed is connected. Therefore, unless the separated state is eliminated, or the team quickly rush into the opponent team, the team will no longer win the game. In this rule, instead of extinguishing a triangle, the triangle may be added to an area acquired by a self-team.

XII. Progress of the Game

Figure 10:
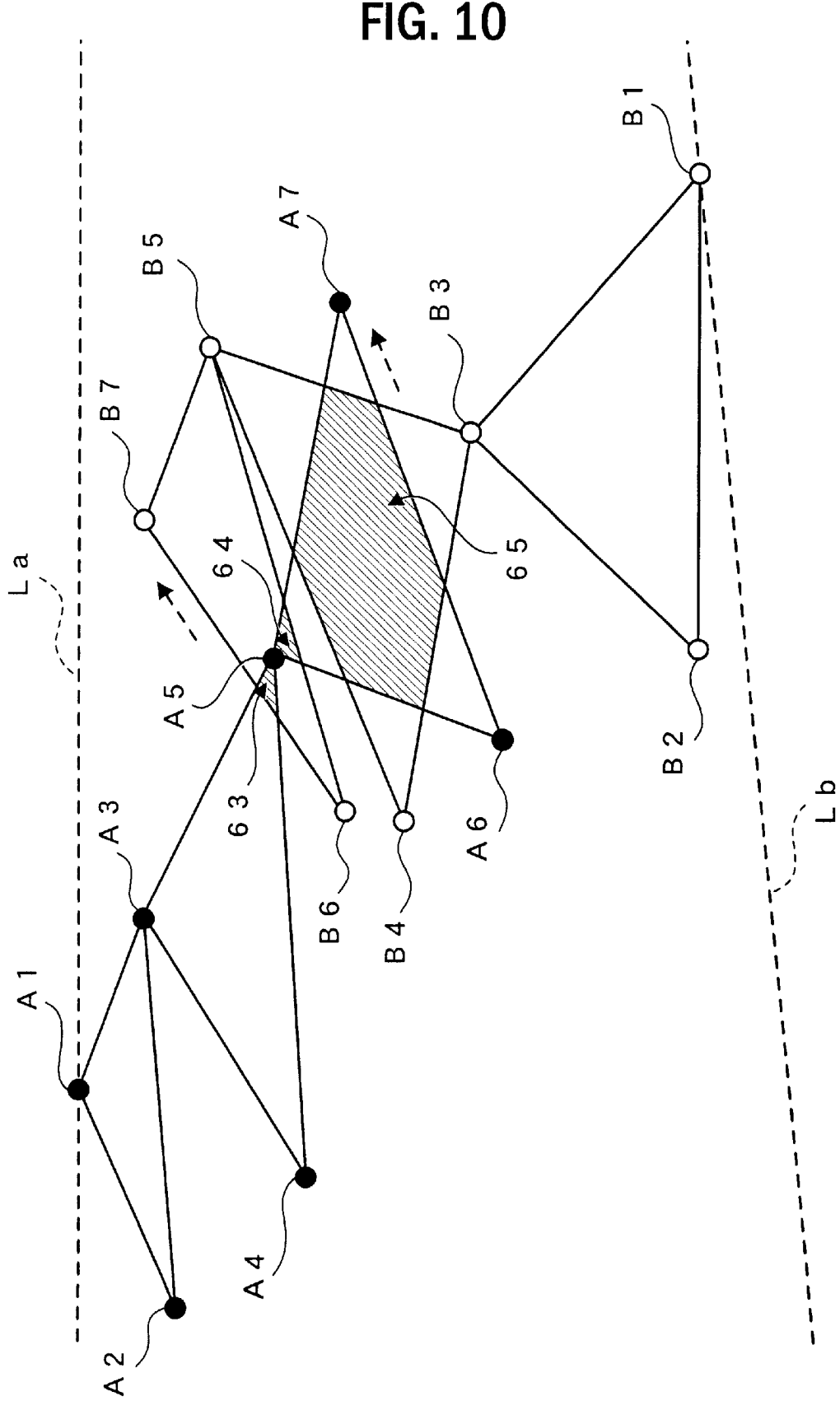
FIG. 10 is a diagram showing the progress of a game displayed on the screen of the referee machine.

FIG. 10 illustrates how the game is actually performed pursuant to the rules mentioned above. The situations of war in both teams are displayed on the screen of the referee machine R. In the figure, reference characters A1 to A7 denote spots at which the flag machine of the A-team was set, and reference characters B1 to B7 denote spots at which the flag machine of the B-team was set. Subscript numbers 1 to 7 indicate the order in which the flag machine is set. In this example, the flag machine in the A-team has been set at the seventh spot A7, and similarly, the flag machine in the B-team has been set at the seventh spot B7. The interference areas between both teams are represented by reference numerals 63 to 56, respectively.

Figure 11:
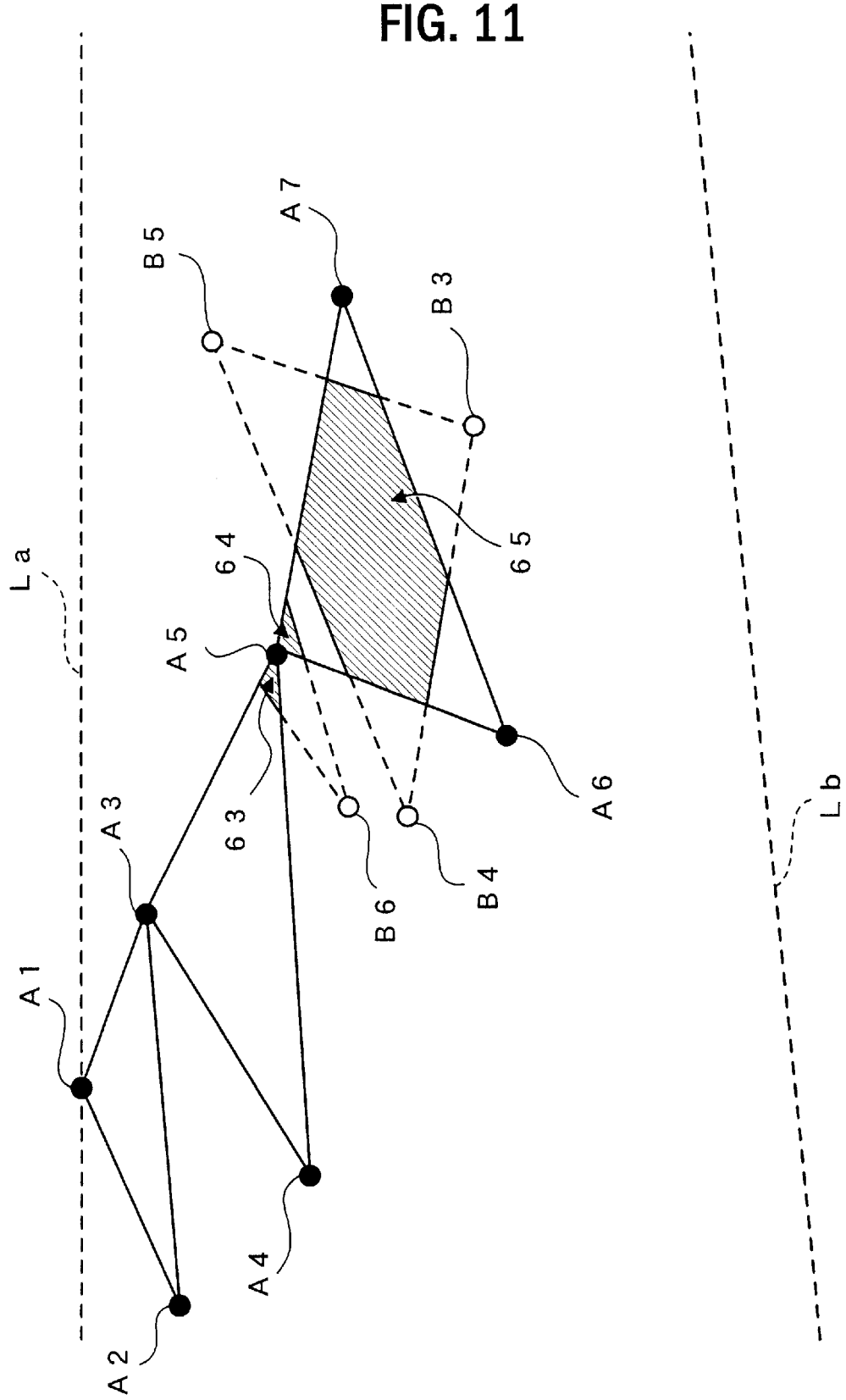
FIG. 11 is a diagram showing the progress of the game displayed on the screen of the parent machine of the A-team.
Figure 12:
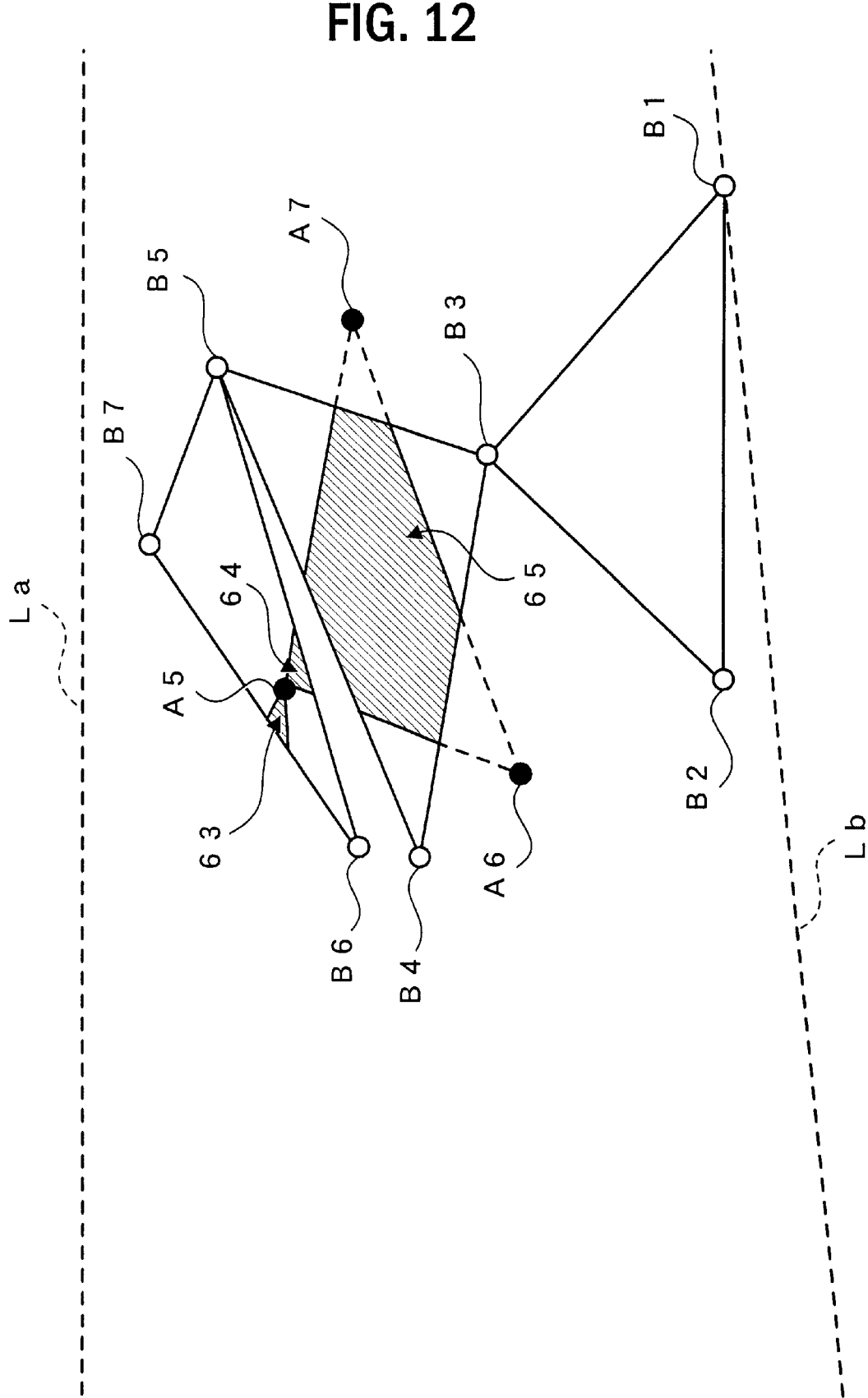
FIG. 12 is a diagram showing the progress of the game displayed on the screen of the parent machine of the B-team.

The progress of the game is displayed on the screen of the parent machine $M_a$ of the A-team, as shown in FIG. 11. The progress of the game is also displayed on the screen of the parent machine $M_b$ of the B-team, as shown in FIG. 12. The operator of the parent machine $M_a$ in the A-team or the operator of the parent machine $M_b$ in the B-team decides whether the self-team overruns the flag-machine spots of the opponent team or rushes into the opponent position, while viewing the display screen mentioned above. Based on the decision, the operator of the parent machine will transmit a proper command to the players of the self-team. The operator of the parent machine $M_a$ in the A-team,for example, can predict some (B3 to B6) of the flag-machine spots of the opponent team, as shown in FIG. 11. Furthermore, the operator of the parent machine $M_a$ can decide that the self-team should overrun the flag-machine spot B3, because the flag-machine spot B3 is located between the current flag-machine spot A7 of the self-team and the opponent position. According to this decision, the operator of the parent machine $M_a$ in the A-team can transmit a proper advancing direction and a proper distance to the players of the self-team and set the flag machine at a spot so that the flag-machine spot B3 is included.

On the other hand, the operator of the parent machine $M_b$ in the B-team can predict some (A5 to A7) of the flag-machine spots of the opponent team, as shown in FIG. 12. However, the flag-machine spots A5 to A7 are located on the side opposite to the advancing direction of the players of the self-team. In this case, it can be decided that rushing into the opponent position is preferable to overrunning the flag-machine spots A5 to A7. According to this decision, the operator of the parent machine $M_b$ in the B-team can transmit a proper advancing direction and a proper distance to the players of the self-team and set the flag machine at a spot within the opponent position (beyond the line $L_a$).

At the time that either team has entered the opponent position, the game ends. The victory or defeat of the game is determined by the size of the area that has been acquired until the end of the game.

According to the aforementioned embodiment, as described above, a game requiring movement of the body can be performed by utilizing GPS satellites. That is, a player sets an arbitrary spot within an extensive game area in cooperation with the other players of the self-team to acquire an area. If the round of the game is repeated, the players will overrun the spot acquired by the opponent team or rush into the opponent position. Furthermore, the progress of the game is made in a virtual game area. This can interest people being accustomed to indoor games such as television games, particularly young people. And young people are urged to join the game. Thus, the game system of the present invention is capable of making a contribution to the relation with people and the growth and health promotion of the body.

Figure 13:
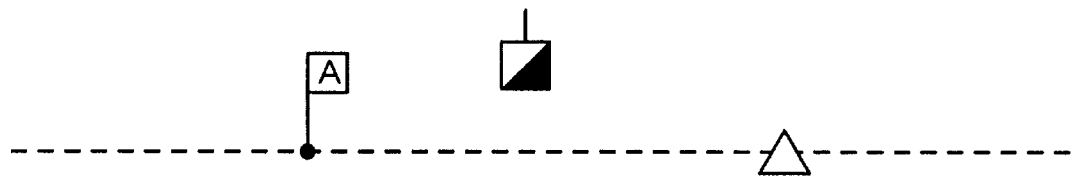
FIG. 13 is a diagram showing another game rule suitable for the embodiment of the present invention shown in FIG. 1.
Figure 13:
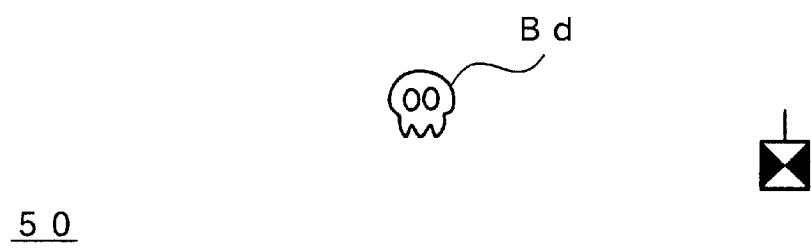
Figure 13:
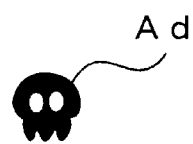
Figure 13:
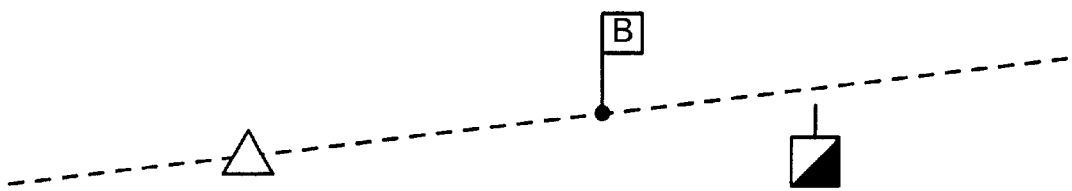

FIG. 13 illustrates another game rule suitable for the aforementioned embodiment. In the figure, two kinds of skull marks are disposed within the game area 50. One skull mark $A_d$ is set at an arbitrary position by the A-team, while another skull mark $B_d$ is set at another position by the B-team. The skull mark of an opponent team is not displayed on the screen of the parent machine of a self-team. If the players of the A-team set the flag machine so that the skull mark $B_d$ is included, the skull mark $B_d$ is displayed on the screen of the parent machine of the A-team when the triangle is formed, and the triangle is invalidated. That is, if it is set at a spot important to defense a self-team, the skull mark can block the way of an opponent team. Note that if the number of skull marks is excessively increased, it will disturb the game. Therefore, it is desirable that the maximum number of skull marks be determined by mutual consent. It is also desirable that the maximum number be managed by the referee machine.

In another embodiment, the decision of enclosure differs from that in the aforementioned embodiment. For example, in FIG. 6, the flag machine moves from the start spot F1 to the spots F2 and F3 and then returns to the start spot F1, and at the start spot F1, the installation detecting section 15 is operated. At this time, the return spot is within a set distance from the start spot and is set to an allowable error range such that the enclosure decision means decides that enclosure is successful. The enclosure decision means may be programmed so that the set distance becomes shorter with the lapse of time. The next start may be any position within the enclosed area, and players need to know whether or not the position is within the enclosed area. For this reason, a spot measured with the flag machine is transmitted to the referee machine. Whether the measured spot is within the enclosed area is transmitted from the referee machine to the flag machine and is displayed on the flag machine. Note that the subsequent start will be penalized if a return spot is not obtained within a predetermined time detected by the installation detecting section.

In the embodiments mentioned above, a score is obtained when the flag machine draws a triangle. However, the flag machine may draw a polygon or a circle.

While the present invention has been described with reference to the preferred embodiments thereof, the invention is not to be limited to the details given herein, but may be modified within the scope of the invention hereinafter claimed.

What is claimed is:

1. A game system comprising:
   detection means for detecting a position of a spot moved from a start spot;
   measurement means for measuring time;
   decision means for deciding whether or not spots measured by said detection means have enclosed an area within a set time measured from said start spot by said measurement means; and
   computation means for computing a size of a distance between the measured spots, or a size of said area enclosed with said measured spots, when said decision means decides that there has been enclosure;
   wherein victory or defeat of a game player is determined by the size of said length or the size of said area, computed by said computation means.

2. The game system as set forth in claim 1, wherein said decision means decides that there has been enclosure, when the last spot of said measured spots is within a set distance from said start spot.

3. The game system as set forth in claim 1, wherein said set distance in said decision means is varied with the lapse of time measured by said measurement means.

4. The game system as set forth in claim 2, wherein said set distance in said decision means is varied with the lapse of time measured by said measurement means.

5. The game system as set forth in claim 1, wherein said set time that is measured with said measurement means can be set so that it varies with every start.

6. The game system as set forth in claim 2, wherein said set time that is measured with said measurement means can be set so that it varies with every start.

7. The game system as set forth in claim 3, wherein said set time that is measured with said measurement means can be set so that it varies with every start.

* * * * *